UNITED STATES PATENT OFFICE.

WALTER P. JENNEY, OF BROOKLYN, NEW YORK.

IMPROVEMENT IN PROCESSES OF TREATING SLUDGE AND SLUDGE-OIL.

Specification forming part of Letters Patent No. 190,762, dated May 15, 1877; application filed October 28, 1876.

*To all whom it may concern:*

Be it known that I, WALTER P. JENNEY, of the city of Brooklyn, county of Kings, and State of New York, have invented a new and Improved Process for Treating Sludge and Sludge-Oil, and the product arising from the practice of said process, of which the following is a specification:

In the purification of hydrocarbon oils produced by the distillation of crude petroleum, asphalts, or bitumens, or by the destructive distillation of coal, resins, or bituminous shales, the oils are agitated with two per cent. or more of concentrated sulphuric acid, (66° Baumé, 1.86 specific gravity,) in order to remove certain oils contained in the distillate, which would, in the course of time, absorb oxygen from the air, and cause the oil to become dark-colored and gummy, and also to remove tarry substances and the disagreeable odor. Sulphuric acid combines chemically with these bodies and dissolves them, forming a dark-red heavy liquid, which settles on the bottom of the agitator, and can then readily be drawn off from the purified oil. This peculiar compound of sulphuric acid and hydrocarbon oils dissolved in the excess of acid is known as "sludge." At present it is purchased by superphosphate manufacturers, who mix it with a little water, which decomposes the compound of acid and oil, producing a weaker acid, (about 50° Baumé,) used in the manufacture of super, phosphate of lime, and a dark colored offensive oil, which rises to the surface of the acid, and usually is thrown away, no commercial use having been found for it. This waste product is called "sludge-oil."

On the 30th day of May, 1876, Letters Patent of the United States were granted to myself—No. 178,061, for a process of treating sludge-oil, whereby the oxidation of the sludge-oil was effected by the use or agency of air, and No. 178,154, for the solid resinous substance, produced by the oxidation of sludge-oil by the said process.

My present invention consists, in part, of a new process of treating sludge, and the substance derived from it known as "sludge-oil," whereby I manufacture, at will, either the new fluid substance—partially-oxidized sludge-oil, hereafter described—or, by a more complete oxidation of the sludge-oil, I produce the solid resinous substance, described and fully set forth in Letters Patent No. 178,154, dated May 30, 1876, in part of the new manufacture or fluid oxidized sludge-oil produced by the said new process, when the oxidation of the sludge-oil is stopped or arrested, as hereafter fully dscribed and set forth.

The mode of practicing my invention is as follows: The sludge sometimes contains illuminating-oil or other free and uncombined oils mixed with it, arising from a want of care on the part of the refiner in drawing off the sludge from the agitator, as described in the introductory paragraph of this specification. These uncombined oils, being less easily oxidized than sludge-oil, interfere with the subsequent steps of the process, and contaminate the final product. To remove these objectionable oils, when found to be present in considerable quantities, the sludge is introduced into a lead-lined tank, and stirred or agitated with about five per cent., by volume, of petroleum-naphtha, gravity 60° to 70° Baumé. The naphtha dissolves these oils, and, rising to the surface, is drawn off and removed after allowing the heavier sludge time to subside to the bottom of the tank.

When only traces of uncombined oils are present in the sludge, this washing with naphtha may be dispensed with.

The sludge is next gently heated by a steam-coil in the bottom of the tank, or in other suitable manner, care being taken, by observing the indications of thermometers placed in different parts of the tank, that the heat does not become too great and injure the product.

The sulphuric acid contained in the sludge acts upon the sludge-oil combined or dissolved in said acid, a portion of the sulphuric acid being decomposed into sulphurous-acid gas which escapes, and oxygen which unites with the sludge-oil.

The temperature of the sludge should in no case be allowed to exceed 212° Fahrenheit, or the acid will act so violently upon the sludge-oil combined or dissolved in it that the product will be difficultly soluble in naphtha, and not so well adapted to the purposes to which it is proposed to apply it. I may define the proper working temperature as between 75°

Fahrenheit and 150° Fahrenheit. At the latter temperature the action is quite rapid, and a brisk effervescence of sulphurous-acid gas may be observed to take place. The length of time required to complete the action of the sulphuric acid on the combined oil varies greatly with different samples of sludge with the working temperature and the degree of oxidation required in the final product—the higher the temperature the more rapid the action. I may define the time required as from twelve hours to forty-eight hours, though in some cases the length of time may be less or even greater than this.

The sludge is kept at as nearly a uniform and constant temperature as possible, and the heating is continued until samples, on testing, show that the action of oxidation has proceeded far enough to produce in the final product the degree of hardness or fluidity which is desired for the particular purpose to which the product is to be applied. This test, to determine the degree of oxidation of the sludge-oil, is made as follows: A sample of the sludge is taken from the contents of the tank and decomposed by the addition of an equal volume of water. The resulting sludge-oil floats on the surface of the heavy and hot mixture of acid and water; but on removing the sludge-oil and placing it in pure water at the common temperature the oil sinks in the water if it be oxidized sufficiently to produce in the final steps of the process the solid resinous substance described in Letters Patent No. 178,154, dated May 30, 1876. I have found, however, by experience that for certain purposes it is best to arrest this oxidation of the sludge-oil, so that the final product shall be a fluid substance of greater or less viscidity or consistency, and to do this I stop the action of the sulphuric acid upon the sludge-oil at a point where by the above test the sludge-oil, although partially oxidized, will still float upon the surface of pure water. This action of the sulphuric acid upon the combined sludge-oil may be assisted by the addition of other oxidizing agents, as five per cent. of oxide of manganese, the manganates of the alkalies, bichromate of potassa, chlorate of potassa, nitric and chromic acids; but the employment of such substances requires great care in this process. After the action of the acid upon the sludge-oil has been maintained for a sufficiently long time the sludge is decomposed by the addition of water, enough water being added to reduce the gravity of the sulphuric acid to about 50° Baumé. After allowing the acid to subside to the bottom of the tank it is drawn off from the sludge-oil and used in the manufacture of superphosphates, or it is renovated and reconcentrated by the processes now in general use.

The oxidized sludge-oil is in many cases so thick and viscid as to be difficult to wash or purify. To obviate this, petroleum-naphtha (gravity 60° to 70° Baumé) is added, a little at a time, to the oxidized sludge-oil, and mixed or stirred with it, the solution of the oil in the naphtha being aided by heat from the steam-coil in the bottom of the tank. The addition of the naphtha is continued until the solution is thin and fluid, so as to be readily washed in the subsequent steps of the process. For this purpose from one to ten barrels of naphtha may be added to ten barrels of oxidized sludge-oil to effect its solution, the quantity of the naphtha varying with the consistency or degree of oxidation of the oil.

When the sludge-oil has been only partially oxidized in the preceding operation, it is often so fluid that, when heated to 212° Fahrenheit, it can readily be washed and purified without thinning with naphtha, and in this case the use of naphtha may be dispensed with.

The oxidized sludge-oil, or the solution of the oxidized sludge-oil in naphtha, is then removed to a lead-lined tank provided with a close-fitting cover and a condensing-worm, so that any naphtha or light oils distilling off, owing to the heat of the steam and water, may be condensed and saved.

Hot water is showered upon the surface of the oxidized sludge-oil, and steam is blown through it to agitate and mix the oxidized sludge-oil with the hot water.

The water rapidly removes the sulphuric acid, mechanically mixed and held in suspension in the oxidized sludge-oil or naphtha solution, and from time to time the washings are drawn off by a waste-pipe at the bottom of the tank. The water-washing is continued until the water flowing from the waste-pipe no longer tastes of acids, or shows its presence in any considerable quantity by the usual chemical tests. The contents of the tank are then allowed to remain at rest for twelve hours, to separate the excess of water held in suspension, the water is drawn off as completely as practicable, and about five per cent., by volume, of a solution of caustic soda (gravity 25° Baumé) is added, and agitated with the oxidized sludge-oil or naphtha solution, by plunging steam through it, to neutralize and remove any remaining traces of acid. A small quantity of ammonia may be added advantageously to the soda solution, and a cheaper, but less convenient, alkaline liquid may be obtained by using milk of lime. After agitation with the alkali, the contents of the tank are allowed to remain at rest for twenty-four hours to separate the alkali, as completely as possible, from the purified oil.

The purified oxidized sludge-oil contains from ten to thirty per cent. of light volatile oils mixed with it, as well as the naphtha, which may have been added to increase its fluidity. To remove these volatile oils and the naphtha, the oxidized sludge-oil is introduced into a still or other suitable vessel, and heat gradually applied, either by a steam-coil inside the still, or, more advantageously, by a fire built underneath it; and to further purify the oxidized sludge-oil, or increase its drying property, from one to five per cent. of oxide of lead or manganese, or five per cent. of a solution of caustic soda, (gravity 25° Baumé,) may be added to the contents of the still.

The heat of the still is gradually raised until the water remaining in the oxidized sludge-oil is removed, and the naphtha and volatile oils distilled off. The distillation may be assisted by steam blown through the oil in the usual manner. The temperature of the contents of the still may be raised to 400° Fahrenheit, or even 500° Fahrenheit, without injury to the product; but a lower temperature is usually sufficient to effect the result.

The time required for this distillation is about twenty-four hours for a charge of twenty barrels of oil, the heat being continued until the naphtha and volatile oils have been removed. The product resulting from this distillation varies in hardness or fluidity with the degree of oxidation of the sludge-oil effected in the preceding operation of oxidation by the sulphuric acid.

If, as hereinbefore mentioned, the oxidation has been carried to the production of a thick viscid oil, which will sink in pure water, the product remaining after the distillation of the naphtha and volatile oils is, at ordinary temperatures, a solid substance, substantially the same as the resinous substance described in Letters Patent No. 178,154; but when the oxidation has been stopped, as hereinbefore described, and the sludge-oil floats on water, the product of the distillation is a fluid substance at ordinary temperatures of a greater or less consistency or viscidity, and distinguished from the solid oxidized sludge-oil described in Letters Patent No. 178,154, in being less oxidized, in having a much lower melting-point, in being somewhat more readily soluble in the different solvents, and in drying much more slowly to a hard substance. Like the solid resinous substance, alkalies have no action on fluid oxidized sludge-oil, except to slightly redden its color.

When desired, this new substance, fluid partially-oxidized sludge-oil, may be combined with india-rubber, as fully described in Letters Patent granted to me, No. 178,153, or it may be made into a varnish by dissolving it with naphtha or other suitable solvents, as described and fully set forth in Letters Patent granted to me, No. 178,152.

The following modification of this process may be sometimes employed: The sludge-oil is taken directly from the manufacturer of superphosphates in the form in which it is at present usually thrown away, containing, mechanically mixed with it, a considerable quantity of sulphuric acid, (gravity about 50° Baumé,) which it is not worth while for the manufacturer to take the trouble to separate. This impure sludge-oil is treated as follows: It is introduced into a lead-lined tank, and gently heated by a steam-coil to a temperature not exceeding 212° Fahrenheit, which is maintained for twenty-four to sixty hours, or until the acid mixed with it has effected the requisite oxidation. This operation resembles that heretofore described in the oxidation of the sludge-oil by the acid combined with it; but, owing to the less quantity of acid and its lower gravity, the action is not as rapid as in the case of sludge, but this can be obviated by working at a slightly higher temperature.

The action of the sulphuric acid may be assisted by the addition of oxidizing agents, as five per cent of oxide of manganese, the manganates of the alkalies, bichromate of potassa, chromic acid, chlorate of potassa; but such additions of oxidizing substances require care in their employment in this process.

When the oxidation of the sludge-oil has proceeded as far as is desired, the same tests being used as in the case of sludge, to determine the degree of the oxidation, the oxidized sludge-oil is thinned by naphtha, if necessary, and then purified by washing and distillation, as hereinbefore described in the treatment of sludge and the oxidized oil produced from it.

What I claim as new, and desire to secure by Letters Patent, is—

1. The process of manufacture herein described for producing from sludge or sludge-oil the manufacture or substance herein described, and possessing the properties or qualities, substantially as described, by oxidizing the sludge-oil by sulphuric acid, substantially as herein described and set forth.

2. The new substance or manufacture herein described, being partially oxidized fluid sludge-oil, possessing the properties or qualities herein described.

WALTER P. JENNEY.

Witnesses:
 BERN. T. VETTERLEIN,
 PHILLIPS ABBOTT.